(12) United States Patent
Smith et al.

(10) Patent No.: US 10,655,308 B2
(45) Date of Patent: May 19, 2020

(54) MODULAR, ADAPTABLE AND EXPANDABLE BOOSTER PUMP SYSTEM

(71) Applicant: IDAC CORPORATION, Stroudsburg, PA (US)

(72) Inventors: Douglas James Smith, Stroudsburg, PA (US); Jeffrey Eugene Howey, Nazareth, PA (US); David Brent Adams, Effort, PA (US); Kyle Andrew Maloney, Stroudsburg, PA (US); Arthur Edward Johnson, Sciota, PA (US)

(73) Assignee: IDAC CORPORATION, Stroudsburg, PA (US)

( * ) Notice: Subject to any disclaimer, the term of this patent is extended or adjusted under 35 U.S.C. 154(b) by 91 days.

(21) Appl. No.: 15/882,246

(22) Filed: Jan. 29, 2018

(65) Prior Publication Data
US 2018/0216320 A1 Aug. 2, 2018

Related U.S. Application Data

(60) Provisional application No. 62/451,810, filed on Jan. 30, 2017.

(51) Int. Cl.
*E03B 5/00* (2006.01)
*F04D 15/00* (2006.01)
*E03B 7/07* (2006.01)
*F04D 13/14* (2006.01)
(Continued)

(52) U.S. Cl.
CPC ............... *E03B 5/00* (2013.01); *E03B 7/075* (2013.01); *F04D 13/12* (2013.01); *F04D 13/14* (2013.01); *F04D 15/0072* (2013.01); *F16L 21/065* (2013.01)

(58) Field of Classification Search
CPC . E03B 5/00; E03B 7/045; E03B 7/075; F04D 15/0072; F04D 13/14
See application file for complete search history.

(56) References Cited

U.S. PATENT DOCUMENTS 3,431,940 A * 3/1969 Hanley ................. G05D 16/208
134/47
4,008,012 A * 2/1977 Page ........................ F04B 3/00
417/454

(Continued)

*Primary Examiner* — Angelisa L. Hicks
(74) *Attorney, Agent, or Firm* — Epstein Drangel LLP; Robert L. Epstein

(57) ABSTRACT

The booster pump system includes a base pump module and one or more expansion pump modules connected to the base pump module. Each pump module has suction and discharge manifolds extending between the pump module sides and at least one pump connected between the manifolds. The expansion pump module suction and discharge manifolds connect to the base pump module manifolds, respectively. The pump modules are bilaterally symmetrical such that either side may be connected to the piping system or to another pump module. A bypass module is connected between the pipes of the piping system. The size of the manifolds is larger than the size of pipes that would normally be used with a pump having the capacity of the pump to which the manifolds are connected. Pump modules are connected to each other and to the piping system by quick release connectors.

8 Claims, 3 Drawing Sheets

(51) Int. Cl.
*F04D 13/12* (2006.01)
*F16L 21/06* (2006.01)

(56) References Cited

U.S. PATENT DOCUMENTS

| | | | | |
|---|---|---|---|---|
| 5,522,707 | A * | 6/1996 | Potter | B23Q 11/1038 417/4 |
| 6,053,702 | A * | 4/2000 | Sears | F04D 15/0072 417/26 |
| 2010/0119380 | A1 * | 5/2010 | Wilson | E21B 41/0007 417/53 |
| 2012/0282121 | A1 * | 11/2012 | Kieffer | B01F 15/042 417/410.1 |
| 2014/0123381 | A1 * | 5/2014 | Stephens | F04B 17/006 4/507 |
| 2014/0309796 | A1 * | 10/2014 | Mueller | F04B 17/04 700/282 |
| 2015/0076063 | A1 * | 3/2015 | Ish-Am | C02F 1/44 210/636 |
| 2016/0157951 | A1 * | 6/2016 | Schoenig | A61G 7/0503 280/830 |

* cited by examiner

MODULAR, ADAPTABLE AND EXPANDABLE BOOSTER PUMP SYSTEM

CROSS-REFERENCE TO RELATED APPLICATIONS

Priority is claimed on Provisional patent application Ser. No. 62/451,810, filed Jan. 30, 2017, the entire contents of which are incorporated herein by reference.

STATEMENT REGARDING FEDERALLY SPONSORED RESEARCH OR DEVELOPMENT

Not Applicable

REFERENCE TO A "SEQUENCE LISTING", A TABLE, OR A COMPUTER PROGRAM LISTING APPENDIX SUBMITTED ON COMPACT DISC

Not Applicable

BACKGROUND OF THE INVENTION

1. Field of the Invention

The present invention relates to hydronic and plumbing piping systems, and more particularly to a modular, adaptable and expandable booster pump system for use in such hydronic and plumbing piping systems.

2. Description of Prior Art Including Information Disclosed Under 37 CFR 1.97 and 1.98

The present invention is a pump system designed to raise the pressure of fluids in the pipes of hydronic and plumbing piping systems. Pressure boosting is required in many of such piping systems in order to provide sufficient pressure and fluid flow to achieve a specific goal for the piping system.

Fluid pressure is reduced as the fluid is lifted vertically in height, in open piping systems, and from friction losses when flowing through piping, fittings, and devices in both open and closed piping systems. If the fluid pressure is not high enough to overcome these losses, fluid flow will decrease and the performance of the piping system will be degraded.

Booster pump systems are used to increase the pressure of the fluid to achieve higher flow rates and overcome friction or height losses in the piping system. Booster pump systems include one more booster pumps connected together with suction manifolds (on the inlet side to the pumps) and discharge manifolds (on the outlet side of the pumps). Separate isolation valves are present to permit the pumps to be removed from the piping network without requiring the network piping to be drained. Separate flow control valves are provided to prevent the fluid from flowing backwards through non-operating pumps. Instrument gauges showing the pressure of the fluid before and after the pump(s) are typically included as are electrical connections and wiring to power the pumps and control circuits to control the operation of the pump(s).

Existing booster pump systems are designed to handle a specific flow range. They are not designed to be linked with other booster pump modules to increase the capacity of the fluid being pressurized. Accordingly, if the capacity requirements of a fluid system increase, it is currently very difficult to add that capacity to an existing system.

The need for increasing pumping capacity arises when either the booster pump selection is undersized for the application or there is a change in the overall fluid system which increases the required flow and/or pressure loss. However, increasing capacity by adding a supplemental booster pump system typically results in the following problems/installation barriers:

1. Connection Points: New connection points for the supplemental package will need to be installed in the existing piping network. In many cases this requires cutting and removing sections of the piping network to provide space for new branch connections.
2. Need for Secondary Manifolds: Secondary suction and discharge manifolds may need to be added to the fluid piping system if the booster pump systems are to be piped together because the manifolds associated with each individual package are not designed for the higher flow capacities of the combined systems.
3. Space Preparation: Finding and preparing the space for an additional booster pump system can be very expensive. Almost all systems are floor mounted units housed in mechanical/plumbing equipment rooms which are not designed with spare space for future/unplanned equipment additions. In some cases adding an additional system requires creating a wholly new space and in other cases it requires relocating existing piping and/or equipment to make room for the additional package.
4. Lack of Control Integration: The existing and added booster pump systems are not integrated with a common control platform and each will act independent of each other. This reduces the efficiency of the overall pumping operation and does not permit for equal wear/runtime of all booster pumps.

It is therefore a prime object of the present invention to provide a booster pump system for use in hydronic and plumbing piping systems.

It is another object of the present invention to provide a booster pump system for use in hydronic and plumbing piping systems which consists of booster pump modules which can be connected together by quick release clamps for ease of design and installation.

It is another object of the present invention to provide a booster pump system for use in hydronic and plumbing piping systems which is adaptable for use with different piping system configurations.

It is another object of the present invention to provide a booster pump system for use in hydronic and plumbing piping systems which is expandable to provide different levels of pressure boost depending upon the intended application.

It is another object of the present invention to provide a booster pump system for use in hydronic and plumbing piping systems which is easily connectible to an existing piping network.

It is another object of the present invention to provide a booster pump system for use in hydronic and plumbing piping systems which includes secondary suction and discharge manifolds associated with each booster pump system such that the booster pump systems may be connected together.

It is another object of the present invention to provide a booster pump system for use in hydronic and plumbing piping systems which is designed to fit into the existing space within a mechanical/plumbing equipment room.

It is another object of the present invention to provide a booster pump system for use in hydronic and plumbing piping systems which is designed to be mounted on a wall.

It is another object of the present invention to provide a booster pump system for use in hydronic and plumbing piping systems in which the existing and added booster pump systems are integrated with a common control platform.

BRIEF SUMMARY OF THE INVENTION

The booster pump system of the present invention specifically designed to be expandable by easily connecting expansion pump modules to a base pump module in order to achieve the total desired flow and pressure needs of the overall fluid system. It integrates the operation of all booster pumps together in a common control platform. Fundamental to this capability is a modular design concept which includes symmetric and uniform manifold designs, ability to easily connect the pump modules together as well as connecting the pump modules with the fluid piping system, module manifold sizing to accommodate higher flow capacities, utilizing control panels which can connect and integrate all of the modules together, and in which the modules are designed to be compact and wall hung.

In general, those objects are achieved by the present invention which relates to a booster pump system for a piping system including a base pump module which has a first side and a second side. Spaced suction and discharge manifolds each extend between the first and second sides of the pump module. At least one pump is connected between the manifolds. The base pump module is bilaterally symmetrical such that either side may be connected to the piping system.

To expand a system, an expansion pump module may be connected to the base module. Like the base module, the expansion module is bilaterally symmetrical and has suction and discharge manifolds which extend from one side of the module to the other. At least one pump is connected between the manifolds. Because the expansion pump module is bilaterally symmetrical, either side of the base pump module may be connected to either side of the expansion module. Further, either side of either the base module or the expansion module may be connected to the pipping system.

The pump modules are connected to each other and to the piping system by quick release connectors. This allows for easy addition or replacement of pump modules.

The pumps of the pump modules are connected to the manifolds of the pump module by quick release clamps. This allows individual pumps to be removed and replaced when required.

Each pump module has at least one pump. However, modules with two or more pumps are appropriate for certain applications. When multiple pumps are provided in the same module, the pumps are connected in spaced, parallel relation to each other between the manifolds.

The manifolds are designed to be oversized as compared to the piping normally used with a pump of the capacity of the pump to which the manifolds are connected. That allows the system to accommodate higher flow capacities.

The piping system has suction and discharge pipes. The suction and discharge pipes are connected to the suction and discharge manifolds of the pump module, respectively. A bypass module may be connected between the pump modules and the pipes of the piping system. The bypass module includes a valve which connects the suction and discharge pipes of the piping system such that the pumping system can be isolated from the piping system when necessary.

In accordance with another aspect of the present invention, a booster pump system is provided for a piping system including a base pump module having suction and discharge manifolds. At least one pump is connected between the manifolds. The pump has a given capacity. The manifolds are larger than the size of a pipe normally used with a pump of the capacity to which the manifold is connected.

The pumping system may include an expansion pump module having the same design as the base pump module, including oversized manifolds.

A second pump may be connected between the manifolds. The second pump is parallel with the first pump.

The base and expansion pump modules are each bilaterally symmetrical. The symmetrical design allows either side of either module to be connected to the piping system or another pump module.

The manifolds of the base pump module are connected to the manifolds of the expansion pump module, respectively, by quick release connectors.

The pumps of the pump modules are connected to the manifolds of the pump module by quick release clamps.

The piping system has suction and discharge pipes connected to the suction and discharge manifolds of the pump module. A bypass module including a valve connects the suction and discharge pipes of the piping system. The bypass module is connected between the piping system and the pump modules.

In accordance with another aspect of the present invention, a booster pump system is provided for a piping system. The booster pump system includes a base pump module and at least one expansion pump module connected to the base pump module by quick release connectors. Each of the pump modules includes suction and discharge manifolds. At least one pump is connected between the manifolds by quick release clamps.

At least one of the base and expansion pump modules is bilaterally symmetrical. That allows the module to be connected to the piping system or to another pump module. Preferably, each of the pump modules is bilaterally symmetrical The pump module manifolds are oversized as compared to pipes normally use with pumps of the capacity of the pump to which they are connected.

The piping system has suction and discharge pipes connected to the suction and discharge manifolds of the pump module. A bypass module is provided including a valve which connects the suction and discharge pipes of the piping system.

BRIEF DESCRIPTION OF THE SEVERAL VIEWS OF DRAWINGS

To these and to such other objects that may hereinafter appear, the present invention relates to a modular, adaptable and expandable booster pump system for use in hydronic and plumbing piping systems as described in detail in the following specification and recited in the annexed claims, taken together with the accompanying drawings, in which like numerals refer to like parts and in which:

DETAILED DESCRIPTION OF THE INVENTION

The booster pump system of the present invention includes at least a one pump module, generally designated A. Pump module A functions as the base of the booster pump system and is therefore referred to as the base pump module.

Figure 1:
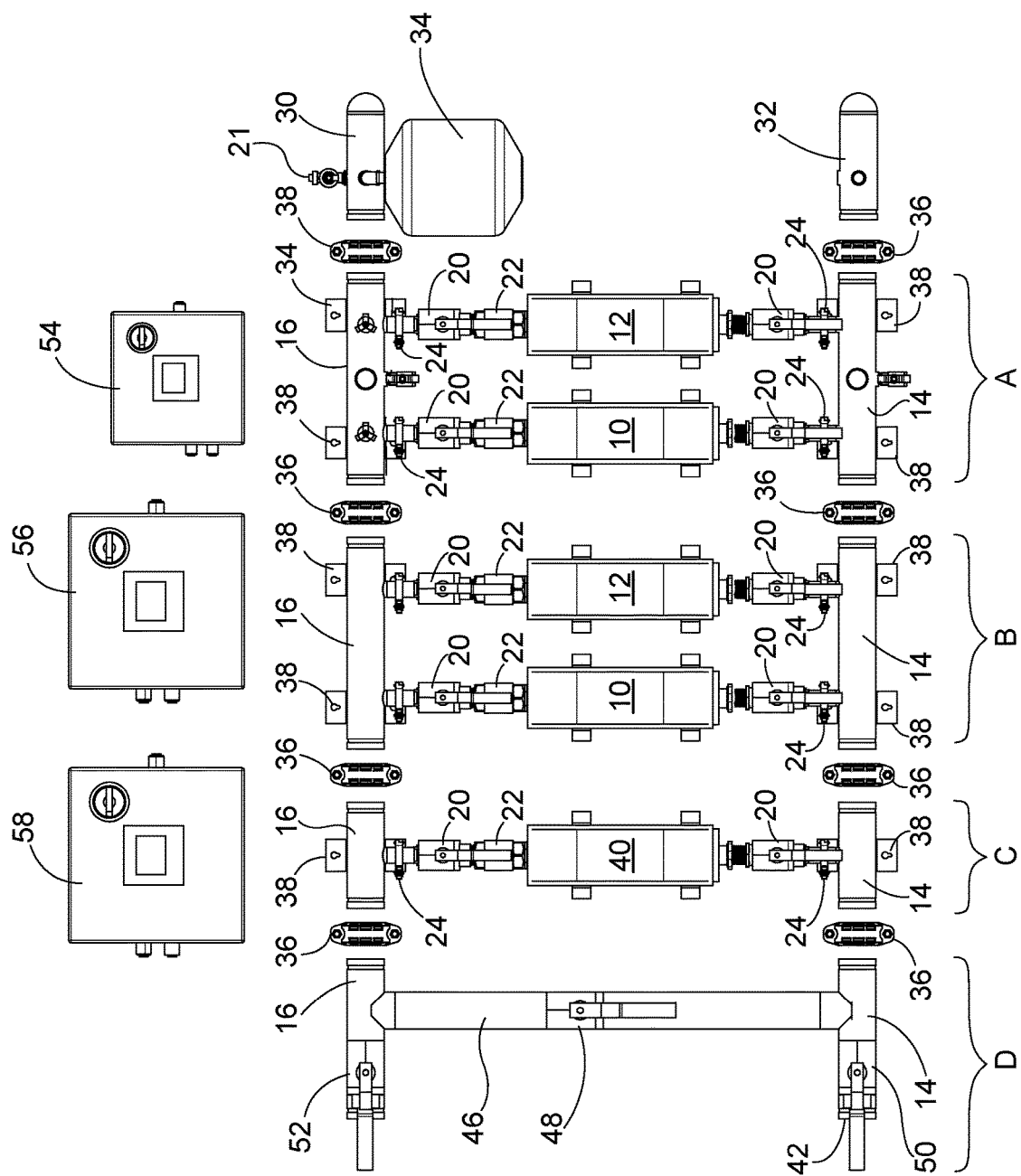
FIG. 1 is an exploded view of a typical booster pump configuration of the present invention including a base pump module, a double pump expansion pump module, a single pump expansion pump module, a bypass module, manifold connectors and control panels.
Figure 3:
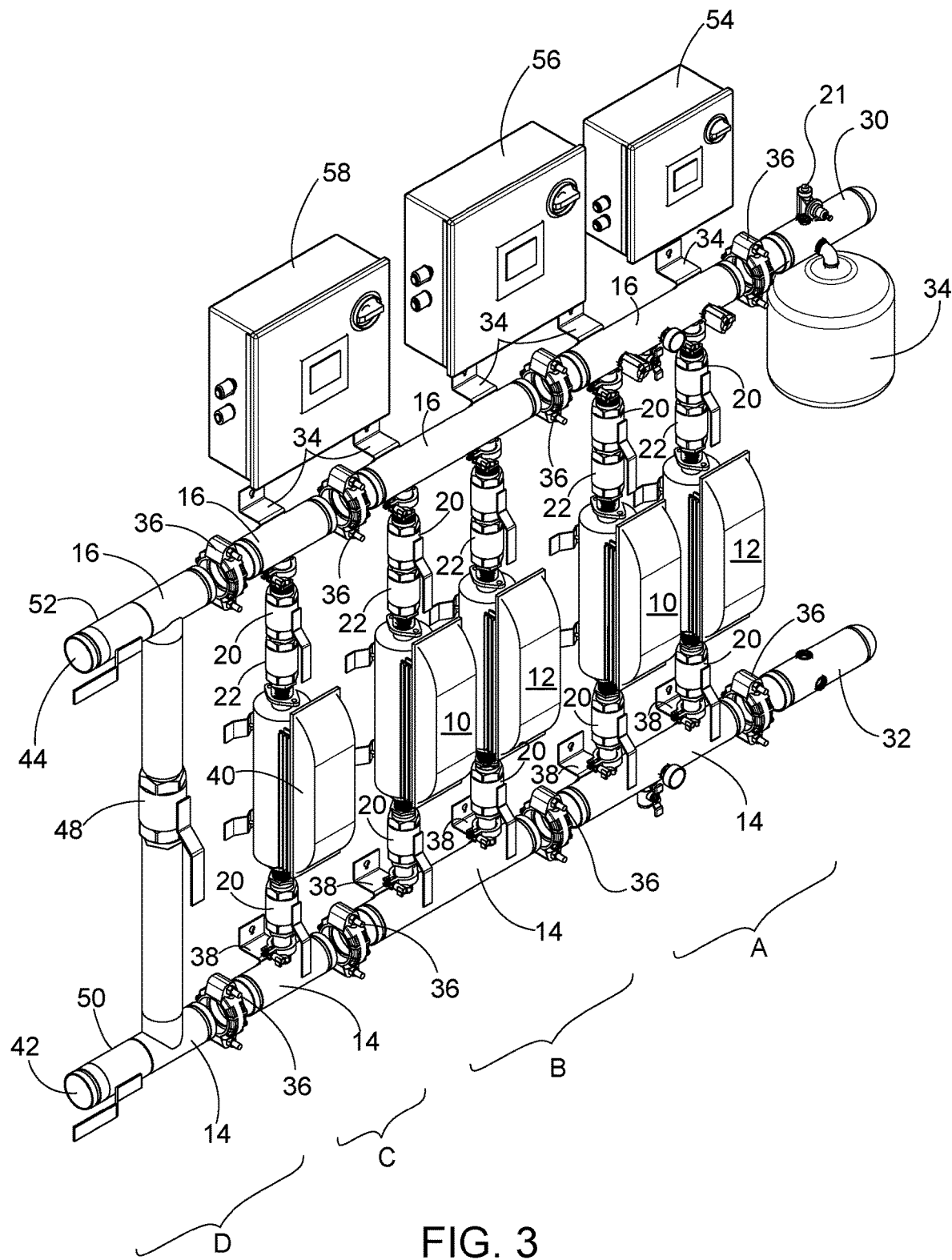
FIG. 3 is an exploded perspective view of the booster pump system of the present invention showing the exterior of the pump casings, the quick release connectors and the wall mounting brackets.

In many applications, base pump module A is connected to at least one other pump module, generally designated B, to expand the pumping capacity of the base pump module. The pump modules that are connected to the base pump module are referred to as expansion pump modules. For purposes of explanation, FIGS. 1 and 3 illustrate the system as including a base pump module A having two pumps, an expansion pump module B having two pumps, and a second expansion pump module having a single pump, generally designated C. However, it should be understood that the number of modules, and the number of pumps in each module, which make up any installation will depend upon the particular application for which the booster pump system is designed.

The booster pump system may also include an optional bypass module, generally designated D. The bypass module connects the suction manifold and the discharge pipes of the piping system, and is situated between the pumping modules and the piping system. The bypass module allows the pump system to be isolated from the piping system.

A single control panel is used to house the pump control circuit for each of the pumps in the system. The size of the control panel will depend upon the number of pumps being controlled.

Figure 2:
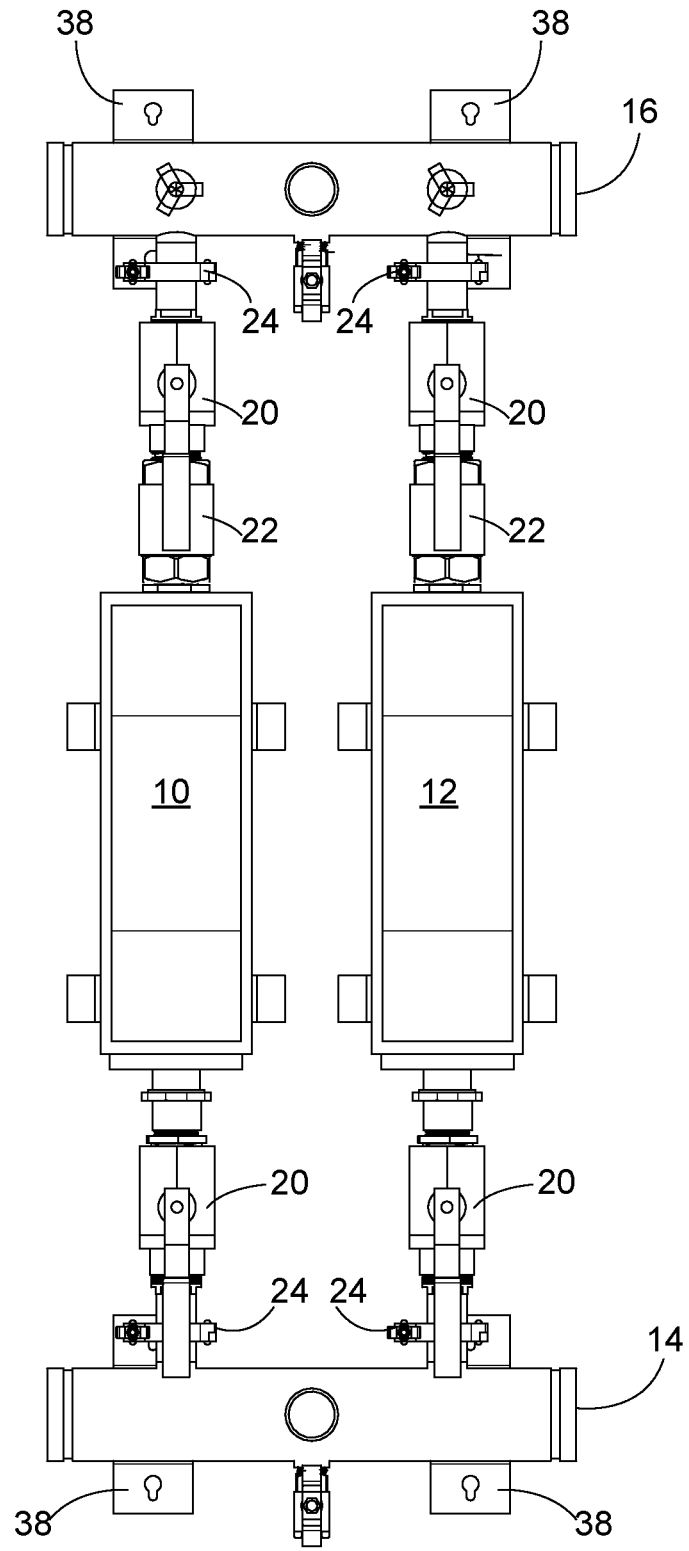
FIG. 2 is an elevation view of a typical double pump base or expansion module.

Each of the pump modules are is bilaterally symmetrical such that either side can be connected to the piping system or to another pump module. For purposes of illustration, FIG. 2 shows a typical two pump module which includes pumps 10, 12. The pumps are connected in parallel between a suction manifold 14 and a discharge manifold 16. Each manifold extends from one side of the module to the other. The module also includes instrumentation (not shown) and a control panel upon which the instrumentation could be displayed, neither of which is shown in FIG. 2.

The pump module of FIG. 2 includes two complete pump circuits. Each pump circuit consists of a pump, isolation valves 20 on the inlet and outlet side of each pump, a check valve 22, and quick release clamps 24. Quick release clamps 24 may be a sanitary stainless steel clamp fitting of the type available from Sanitary Solutions, Inc. of West Columbia, S.C.

The pump module is designed to be used with two caped end pieces 30 and 32, as seen on FIG. 1. End piece 30 includes a pressure tank 34 connected to the end of discharge manifold 16 by a quick release connector 36, a pressure relief valve 21, and an end cap. End piece 32 only contains an end cap and connected to one end of suction manifold 14 by a quick release connector 36. Connector 36 may be a Quickvic™ coupling available from Victaulic Company of Easton, Pa.

Each of the manifolds 14, 16 are provided with two brackets 38. Brackets 38 are used to mount the pump module on a wall.

The structure of the pump module is bilaterally symmetrical. The suction manifold 14 and the discharge manifold 16 each extend from one side of the module to the other side such that they have symmetric connection points at either side of the pump module. That allows the installer to use either side of the base pump module for connecting to the fluid system piping network or for connecting additional expansion pump modules. The compact design of the pump module limits the space requirements needed for the module installation.

The pump module illustrated in FIG. 2 could be a base pump module A or an expansion pump module B. Each would have the same components and the same bilaterally symmetrical configuration. Expansion pump module B would be connected to base pump module A as shown in FIG. 1. In particular, suction manifold 14 of expansion pump module B is connected to suction manifold 14 of base pump module A by a quick release connector 36. Likewise, discharge manifold 16 of expansion manifold B is connected to discharge manifold 16 of base pump module A by a quick release connector 36.

Like base pump module A, expansion pump module B is bilaterally symmetrical. The suction and discharge manifolds extend from one side of the module to the other such that the module has symmetric connection points at either side of the module. That allows the installer to use either side of the expansion pump module B for connecting to the fluid system piping network, to the base pump module A or to additional expansion pump modules.

The booster pump system layout illustrated in FIGS. 1 and 3 includes a second expansion pump module C connected to the other side of expansion pump module B. Expansion pump module C differs from expansion pump module B in that it includes only a single pump 40. Pump 40 is connected between suction manifold 14 and discharge manifold 16. Quick release clamps 24 connect pump 40 to the manifolds.

Expansion pump module C is also bilaterally symmetrical. In the pump module layout illustrated in the drawings, one side of suction manifold 14 of expansion pump module C is connected to suction manifold 14 of expansion pump module B by a quick release connector 36. One side of discharge manifold 16 of expansion pump module C is connected to discharge manifold 16 of expansion pump module B by a quick release connector 36. However, it should be noted that the positions of the modules A, B and C may be interchanged as needed in any particular application and that module C may be connected to the end caps, to module A or to module B.

The other side of suction manifold 14 and the discharge manifold 16 of expansion pump module C may be connected directly to the piping system suction pipe 42 and piping system discharge pipe 44. However, for certain installations it is preferable to include bypass module D in the system. Bypass module D consists of a suction pipe section 14 and a discharge pipe section 16. Suction pipe section 14 of bypass module D is connected between suction manifold 14 of expansion pump module C and the outlet pipe 42 of the piping system by quick release connectors 36. Discharge pipe section 16 of the bypass module D is connected between discharge manifold 16 of expansion pump module C and inlet pipe 44 of the piping system by quick release clamps 36.

A valve 50 is provided between outlet pipe 42 of the piping system and suction pipe section 14 of bypass module D. A valve 52 is provided between inlet pipe 44 of the piping system and discharge pipe section 16 of bypass module D.

Valves 50 and 52 permit the booster pump system to be isolated from the piping system.

Suction pipe section 14 of bypass module D is connected to discharge pipe section 16 of bypass module D by a bypass pipe 46. Bypass pipe 46 has a manually operated bypass valve 48 which opens and closes bypass pipe 46. When valve 48 is open, bypass module allows the pump modules to be isolated from the piping system without disrupting the fluid flow of the overall piping network.

It should be noted that the size the pipes that make up the suction and discharge manifolds of the pump modules are selected to be larger than the pipes normally associated with pumps having a capacity of the pumps to which the manifolds are connected. By oversizing the manifolds of the expansion pump modules, additional pumping capacity can be added without concern that the pump module manifold cross-sectional area will have a pressure restriction constraint from the increased fluid flow.

Multiple expansion modules can be attached to a base module to achieve the flow and/or pressure levels required by the particular application. Control circuits of all of the pumps are connected to a single control panel. The control panel is designed to operate all of the pumps in the entire system to achieve the desired pressure and usage profile.

The drawings show three control panels 54, 56 and 58. Control panel 54 is smaller in size and represents a control panel suitable of a system with only a single base module A. Control panel 56 represents a control panel which would be suitable for use with a system consisting of a base pump module A and a single expansion pump module B. Control panel 58 represents a control panel suitable for use in a system including a base module A, and two expansion modules B and C, where expansion module C has a single pump.

While only a single preferred embodiment of the present invention has been disclosed for purposes of illustration, it is obvious that many modifications and variations could be made thereto. It is intended to cover all of those modifications and variations which fall within the scope of the present invention, as defined by the following claims:

We claim:

1. A booster pump system for a piping system of the type having a suction manifold with a closed end section and a discharge manifold with a closed end section, said booster pump system comprising: a first pump module and a second pump module; said first pump module comprising at least a first suction manifold section having a first end with a connector and a second end with a connector, at least a first discharge manifold section having a first end with a connector and second end with a connector, and first and second pumps connected in parallel between said first suction manifold section and said first discharge manifold section; said a second pump module comprising at least a second suction manifold section having a first end with a connector and a second end with a connector, at least a second discharge manifold section having a first end with a connector and second end with a connector, and at least one pump connected between said second suction manifold section and said second discharge manifold section, wherein each of said ends of said first suction manifold section configured to be connected to one of said ends of said second suction manifold section or to the closed end section of the suction manifold, and each of said ends of said first discharge manifold section configured to be connected to one said ends of said second discharge manifold section or to the closed end section of the discharge manifold.

2. The booster pump system of claim 1 further comprising a bypass module including a valve connecting the suction manifold and the discharge manifold of the piping system.

3. The booster pump system of claim 1 wherein said second pump module comprises first and second pumps connected in parallel between said second suction manifold section and said second discharge manifold section.

4. The booster pump system of claim 1 further comprising a third pump module, said third pump module comprising a third suction manifold section having first and second ends with connectors, a third discharge manifold section having first and second ends with connectors and at least one pump connected between said third suction manifold section and said third discharge manifold section.

5. The booster pump system of claim 4 wherein said third pump module comprises first and second pumps connected in parallel between said third suction manifold section and said third discharge manifold section.

6. The booster pump system of claim 1 wherein said connectors are quick release connectors.

7. The booster pump system of claim 1 wherein said first pump module is bilaterally symmetrical.

8. The booster pump system of claim 1 wherein said second pump module is bilaterally symmetrical.

* * * * *